March 28, 1967  F. C. GALEY  3,311,245
TOWING TRAILER

Filed Feb. 1, 1965  2 Sheets-Sheet 1

INVENTOR.
Floyd C. Galey
BY
Barnard, McGlynn & Reising
ATTORNEYS

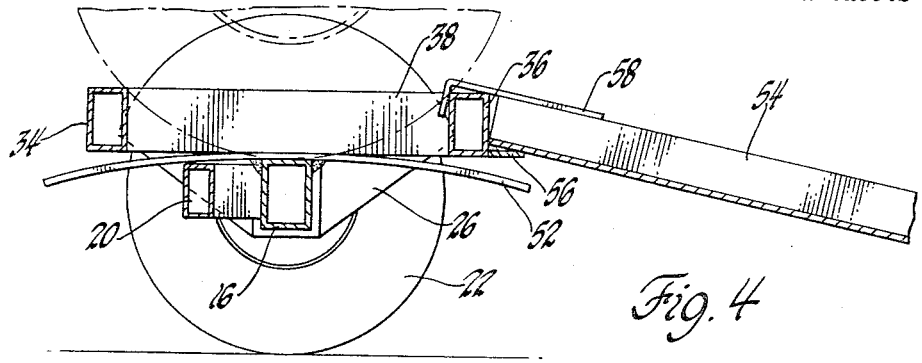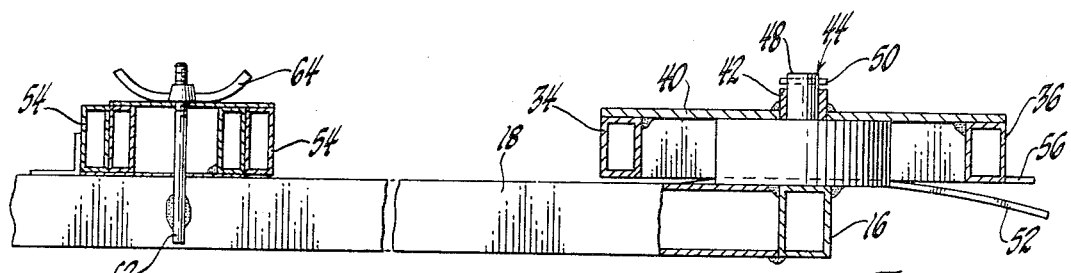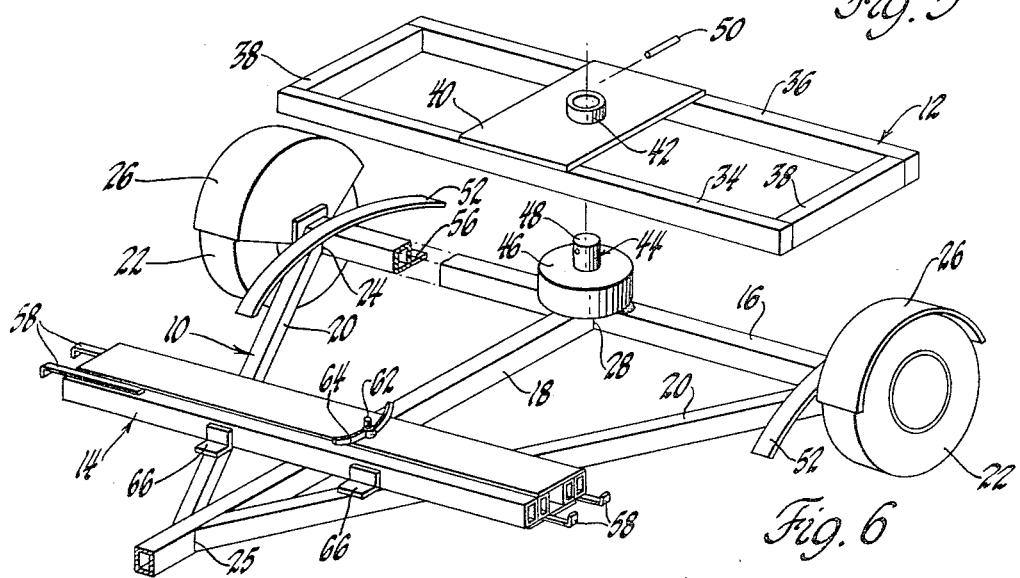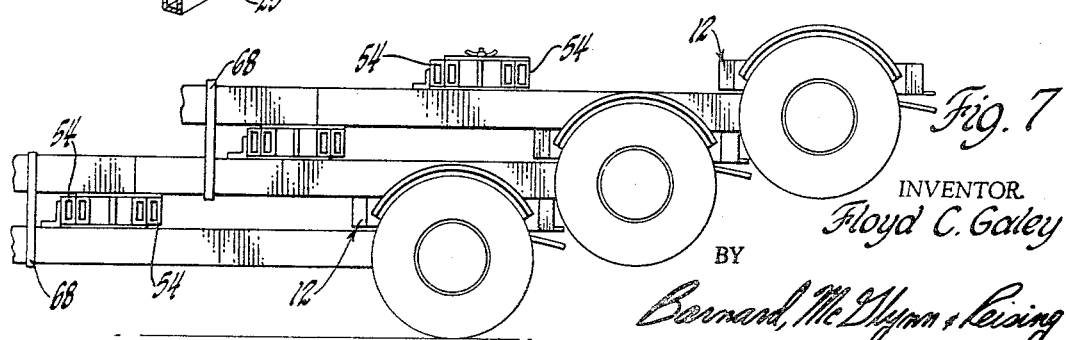

United States Patent Office 3,311,245
Patented Mar. 28, 1967

3,311,245
TOWING TRAILER
Floyd C. Galey, 359 N. Eton, Apt. B,
Birmingham, Mich. 48008
Filed Feb. 1, 1965, Ser. No. 429,568
20 Claims. (Cl. 214—85)

This invention relates to a towing trailer of the type for supporting either the front or back pair of wheels of an automobile or the like, and more particularly, to a towing trailer including a trailer frame adapted to be connected to a towing vehicle, a pair of trailer wheels rotatably attached to the trailer frame, and a support frame rotatably mounted on the trailer frame between the trailer wheels to cradle a pair of automobile wheels which may be disposed at various distances apart on the support frame whereby stability of the towing trailer is provided as it is towing an automobile and whereby the automobile wheels may contact the trailer frame so that during normal straight road travel, shocks will be transmitted from the towed automobile wheels to the trailer frame.

A particular need has arisen for a satisfactory trailer adapted to accommodate either the front or rear wheels of an automobile so that the automobile may be towed. To illustrate, commercial automobile leasing companies have depots in major cities and it often occurs that two or three automobiles belonging to a particular depot are left by customers in a distant city. To return the automobiles to the proper depot, it requires a driver for each of the vehicles, or one automobile could be towed by another so that one driver is needed for every two automobiles. However, to affect this towing operation with vehicles having automatic transmissions, which is normally the case, it usually takes between one and two hours to disconnect the drive shaft to the rear wheels of the automobile intended to be towed. Disconnection of the drive shaft to tow an automobile is necessary in that it it were not disconnected, the pump of the transmission would be driven as the automobile is being towed.

A solution to this problem heretofore has been to utilize a trailer to support the rear wheels of the towed automobile so that the trailer may be connected to the driven automobile thereby to tow the second automobile without disconnecting the drive shaft.

However, trailers of this general type heretofore utilized have not proved entirely satisfactory. The patent to Hale 2,628,733, which issued Feb. 17, 1953, discloses a towing trailer of the instant type, but one which does not provide all of the characteristics or solve all of the problems associated with towing modern automobiles.

One problem associated with the towing of modern automobiles is that different automobiles have back wheels, or front wheels, which are various distances apart. That is to say, among different automobiles the distance between the rear wheels varies and the distance between the front wheels varies from automobile to automobile. The portion of a towing trailer which supports either the rear or front wheels of an automobile must, therefore, be capable of supporting automobile wheels which are at various distances apart.

Another factor to be taken into consideration is that when a trailer is towing an automobile down the highway, the trailer and automobile together must be as stable as possible. The stability of such a towing trailer is greatly reduced when the wheels of the trailer are disposed within, or between, the wheels of the automobile being towed. That is to say that as the wheels of an automobile being towed rest on the towing trailer outside of the wheels of the trailer, the stability of the trailer and the automobile being towed as it moves along the highway is not satisfactory.

It is also necessary that the portion of the towing trailer, which supports the wheels of the automobile being towed, be rotatable relative to the main towing trailer frame so that when the towing vehicle negotiates a curve in the highway or goes around a corner, there can be relative rotation between the trailer and the towed automobile. Many towing trailers heretofore available, such as that disclosed in the above patent, utilize a support frame rotatably mounted on the towing trailer frame for supporting the wheels of the automobile to be towed which rest on the support frame at a distance from the rotatable connection between the support frame and the trailer frame. If the support frame is not supported by the trailer frame directly beneath the support frame where the towed automobile wheels are resting, the support frame will be cantilevered in each direction away from the rotatable support to the point at which the towed automobile wheels are supported. This puts great stress upon the support frame, especially when irregularities in the highway or roadway transmit shocks or vibrations to the towed automobile which are in turn transmitted to the support frame. There is no known satisfactory towing trailer which supports the wheels of the towed automobile so that shocks and vibrations will be transmitted directly through the wheels of the towed automobile to the trailer frame without subjecting the rotatable support frame to high structural stress loads.

Another problem associated with heretofore known towing trailers is that they are not suitable for mass storage and movement between two geographically distant cities or towns. For example, if four or five towing trailers are needed in one city but the towing trailers are situated in a distant city, each of the five trailers must be towed to the city where they are needed.

Accordingly, it is an object and general feature of the present invention to provide an automobile towing trailer which is suited for towing any one of various automobiles each of which may have different distances between the pair of wheels to be supported by the trailer.

Another object and feature of the present invention is to provide an automobile towing trailer having wheels disposed outwardly of the wheels of the automobile being towed so that the towed automobile in combination with the trailer is stable during movement along the roadway.

Yet another object and feature of the present invention is to provide an automobile towing trailer including a trailer frame and a support frame for receiving the wheels of an automobile to be towed such that there may be articulation between the trailer frame and the towed auto-trailer frame and a support frame for receiving the wheels of the towed automobile to contact the trailer frame during normal straight movement along the highway so that at least some of the shocks and vibrations of the towed automobile will be transmitted through the wheels thereof directly to the trailer frame.

Still another object and feature of the present invention is to provide an automobile towing trailer comprised of elements uniquely interrelated whereby a plurality of trailers constructed in accordance with the instant invention may be stacked one upon the other so that as the stacked trailers are being towed over the roadway, all of the stacked trailers are disposed relative to the roadway in substantially the same manner.

A further object and feature of this invention is to provide an automobile towing trailer having a pair of wheels rotatably attached thereto and a support frame rotatably mounted thereon to cradle a pair of automobile wheels which may be at any one of various distances apart to allow the automobile wheels to contact the trailer frame inwardly of the trailer wheels so that the traveling trailer and towed automobile will be very stable and so that at least some of the excessive shocks of the towed automobile will be transmitted directly to the trailer frame.

In general, these and other objects may be accomplished by a towing trailer constructed in accordance with the instant invention having an axle with a trailer wheel rotatably mounted on each end thereof, and a tongue connected at one end thereof to the axle and adapted to be connected at the other end thereof to a towing vehicle. A support frame is rotatably mounted on the trailer frame and comprises a pair of elongated members secured in spaced apart parallel relationship by connecting members adjacent the ends thereof, and a plate interconnecting the parallel members substantially midway along the length thereof. The plate is rotatably connected to the trailer frame. The parallel members are spaced apart to cradle therebetween any one of various pairs of automobile wheels, which may be at different distances apart, so that the automobile wheels may contact the axle. Arcuate members are attached to the axle adjacent each trailer wheel for the connecting members of the support frame to bear against and to guide the connecting members over the axle upon rotation of the support frame relative to the axle. Also included is a pair of ramps and means on the tongue for removably securing the ramps on the tongue when the ramps are not in use for loading an automobile on the trailer. A flange is disposed on the rearward parallel member of the support frame for one end of each ramp to rest thereon so that a pair of wheels of an automobile to be towed may be rolled up the respective ramps and into a cradled position between the parallel members of the support frame.

Other objects and attendant advantages of this invention will be readily appreciated as the same becomes better understood by reference to the following detailed description when considered in conjunction with the accompanying drawings wherein:

FIGURE 4 is a fragmentary cross-sectional view taken along line 4—4 of FIGURE 3;

FIGURE 5 is a fragmentary cross-sectional view taken along line 5—5 of FIGURE 3;

FIGURE 6 is an exploded isometric view of the towing trailer of the instant invention; and FIGURE 7 is a fragmentary side elevational view showing a plurality of towing trailers of the instant invention stacked one upon the other.

Referring now to the drawings, wherein like characters indicate like or corresponding parts throughout the several views, there is shown a towing trailer including a trailer frame, generally shown at 10, a support frame, generally shown at 12, and a pair of ramps, generally shown at 14.

Figure 1:
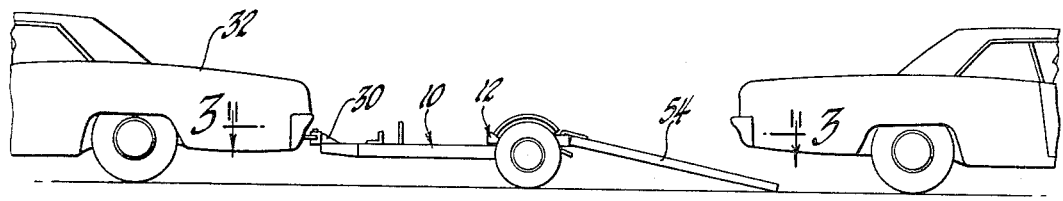
FIGURE 1 is a fragmentary elevational view showing the towing trailer of the instant invention connected to a towing vehicle and ready to receive an automobile to be towed.

The trailer frame 10 comprises an axle 16, a tongue 18, and a pair of structural members 20. There is included a pair of trailer wheels 22 each of which is rotatably attached to one end of the axle 16. The structural members 20 are each connected at one end 24 to the axle 16 adjacent one end thereof. The structural members 20 are connected at the opposite end 25 to the tongue 18. Also secured to the axle 16 are the fenders 26, which serve as coverings for the upper portion of each trailer wheel 22. The tongue 18 is connected at one end 28 to the axle 16 and is adapted by a hitch 30 at the other end to be connected to a towing vehicle 32.

The support frame 12 includes a pair of elongated parallel members 34 and 36. Means comprising the connecting members 38 adjacent the ends of parallel members 34 and 36 secure the parallel members 34 and 36 in a spaced apart relationship. The plate 40 interconnects the parallel members 34 and 36 at a point substantially midway along the length of the parallel members 34 and 36. The plate 40 has an aperture therein in which the collar or sleeve 42 is secured by welding or brazing, or the like. A shaft means, generally shown at 44, is attached to the axle 16 of the trailer frame so as to extend therefrom for journaled disposition in the collar 42 of the plate 40. The shaft means 44 includes a circular bearing plate 46 which is welded or secured by any other appropriate means to the axle 16, and a shaft 48 which extends upwardly from the bearing member 46. The collar 42 is rotatably retained on the shaft 48 by an appropriate means, such as the pin or bolt 50, which passes through the shaft 48.

The parallel elongated members 34 and 36 of the support frame 12 are spaced apart so as to be engageable with and receive a pair of automobile wheels so that the automobile wheels are cradled between the elongated members 34 and 36. A pair of automobile wheels are shown in phantom in the cradled position between the elongated members 34 and 36 in FIGURE 3. The automobile wheels cradled in the support frame 12 may be disposed at any one of various distances apart. That is to say, various different automobiles may be respectively towed by the trailer even though each of the automobiles might have a different distance between either the back or the front pair of wheels. This is most clearly shown in FIGURE 3, wherein it is shown that an automobile wheel may be cradled in the support frame 12 anywhere along the elongated members 34 and 36 between the plate 40 and the connecting members 38.

Figure 3:
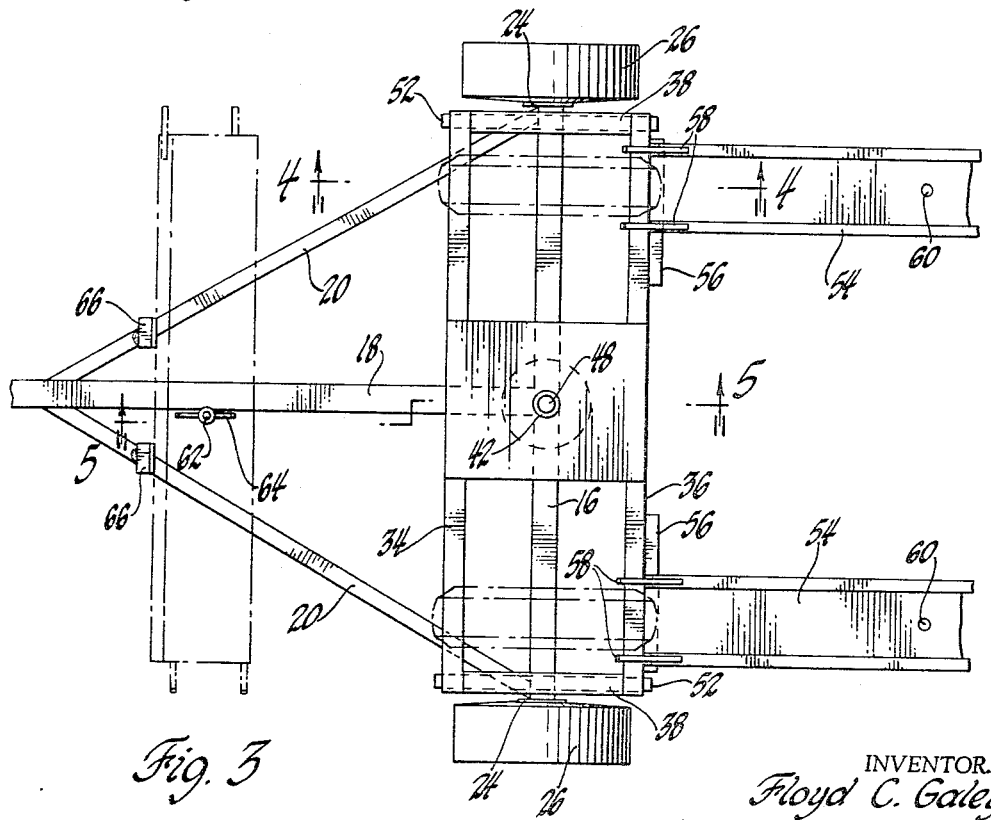
FIGURE 3 is a fragmentary enlarged plan view taken along line 3—3 of FIGURE 1.

Furthermore, the elongated members 34 and 36 of the support frame 12 are spaced apart for allowing the automobile wheels to contact the axle 16 of the trailer frame 10. This is more clearly shown in FIGURE 4, where an automobile wheel is shown in phantom cradled between the elongated members 34 and 36 and in contact with the axle 16. The support frame 12 cradles the automobile wheels so that the automobile wheels may contact the axle 16 when the automobile wheels are disposed over the axle 16. That is to say, when the support frame 12 rotates relative to the axle 16 of the trailer frame 10, the wheels of the automobile will not be in contact with the axle 16. However, during normal straight line highway travel, where the support frame 12 is disposed relative to the trailer frame 10 as shown in FIGURES 3 and 4, the wheels of the automobile will contact the axle 16 so that at least some vibrations or shocks caused by a rough roadway or the like in the automobile being towed will be transmitted through the automobile wheel directly to the axle 16 thereby eliminating over-stressing of the support frame 12.

The trailer frame 10 also has attached thereto means to bear against the connecting members 38 of the support frame 12 which includes the arcuate members 52. The arcuate members 52 are attached to the axle 16 adjacent each of the trailer wheels 22. When the towing vehicle negotiates a turn or corner, the support frame 12, when cradling a pair of towed automobile wheels, must articulate or rotate relative to the trailer frame 10. Upon the rotation of the support frame 12 relative to the trailer frame 10, the connecting members 38 will move to one side or the other of the axle 16 and in so doing will be cantilevered about the rotatable connection between the support frame 12 and the trailer frame 10. The ends of the support frame 12, therefore, will tend to bend or droop under the weight of the automobile wheels. In the event such bending or drooping of the ends of the support frame 12 occurs, the arcuate members 52 guide the ends, i.e., the connecting member 38, of the support frame 12 over the axle 16 when the support frame 12 is rotated in such a manner so as to be realigned parallel with the axle 16. When the support frame 12 is realigned with the axle 16, the connecting members 38 bear against the arcuate members 52 directly above the axle 16. It is in this aligned position of the support frame 12 and the axle 16 that all or part of the load of the towed automobile may be carried by the axle 16 due to the contact of the automobile wheels with the axle 16.

The trailer assembly also includes a pair of ramps 54 for loading an automobile to be towed onto the support frame 12. A flange means including a pair of flanges 56 are disposed along the elongated member 36, which is disposed rearwardly of the trailer. The flanges 56 support one end of each of the ramps 54 so that either the front or back pair of wheels of an automobile may be rolled up the respective ramps 54 and into a cradled position in the support frame 12, as shown in FIGURES 1 and 4. The ramps also include means comprising the members 58 for engaging the rearwardly disposed elongated member 36 to prevent the respective ramps 54 from slipping off the flange 56.

Figure 2:
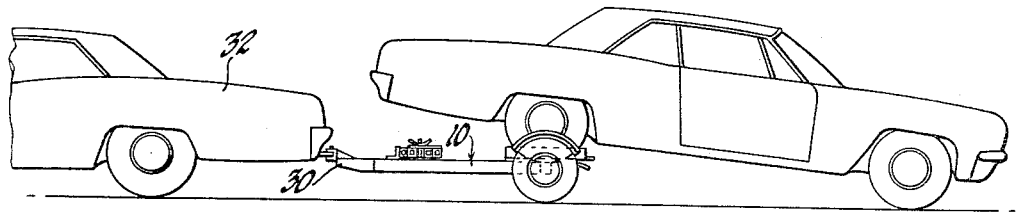
FIGURE 2 is a fragmentary side elevational view showing the towing trailer of the instant invention connected to a towing vehicle and supporting an automobile to be towed.

The ramps 54 have holes 60 therethrough. A means is disposed on the tongue 18 for removably securing the ramps 54 on the tongue and includes a threaded support shaft 62. The support shaft 62 is welded or secured by any other appropriate means to the tongue 18. A means comprising the wing nut 64 is selectively threadedly engageable with the support shaft 62. The ramps 54 may be mated together, as shown in FIGURES 2, 5 and 6, and placed upon the tongue with the support shaft 62 extending through the holes 60 in the ramps. The wing nut may then be threaded onto the support shaft 62 to secure the ramps on the tongue. Means comprising the plates or flanges 66 are disposed on the structural members 20 and engage the ramps 54 when the ramps are placed on the tongue to prevent the ramps 54 from rotating about the support shaft 62.

As is more clearly illustrated in FIGURE 7, when the towing trailer is attached to a towing vehicle, the upper extremity of the ramps 54 is substantially level with the upward extremity of the elongated members 34 and 36 of the support frame 12 so that a plurality of towing trailers may be stacked one upon the other whereby the stacked towing trailers will be substantially horizontally disposed relative to the roadway. That is to say, if the trailer upon which a plurality of other trailers are stacked is substantially horizontally disposed relative to the roadway over which it travels, then the remainder of the stacked trailers will also be substantially horizontally disposed relative to the roadway over which they travel. Therefore, the ramps may be disposed on the tongue so that another trailer may be stacked so as to rest on the support frame 12 and the ramps 54. The straps or belts 68 may then be utilized to secure the stacked trailers together. Although two belts 68 are shown, it is equally appropriate to use one belt or strap to secure all of the stacked trailers together.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

I claim:

1. A towing trailer of the type for supporting either the front or back pair of wheels of an automobile or the like comprising; a trailer frame adapted to be connected to a towing vehicle, a pair of trailer wheels rotatably attached to said trailer frame, a support frame rotatably mounted on said trailer frame for cradling any one of various pairs of automobile wheels which may have any one of various different distances therebetween, said support frame being rotatably mounted and disposed between said trailer wheels to provide stability of the trailer as an automobile is being towed thereby, and means disposed on said trailer frame adjacent each trailer wheel for said support frame to bear against and to guide said support frame over said trailer frame as said support frame rotates relative to said trailer frame.

2. A towing trailer of the type for supporting either the front pair or the back pair of wheels of an automobile or the like comprising; a trailer frame adapted to be connected to a towing vehicle, a pair of trailer wheels rotatably attached to said trailer frame, and a support frame rotatably mounted on said trailer frame, said support frame including a pair of spaced parallel members for cradling any one of various pairs of automobile wheels which may have any one of various different distances therebetween whereby the automobile wheels extend below said parallel members and may be partially supported by said trailer frame.

3. A towing trailer of the type for supporting either the front pair or the back pair of wheels of an automobile or the like comprising; a trailer frame adapted to be connected to a towing vehicle, a pair of trailer wheels rotatably attached to said trailer frame, a support frame rotatably mounted on said trailer frame for cradling any one of various pairs of automobile wheels which may have any one of various different distances therebetween and for allowing the automobile wheels to contact said trailer frame, said support frame being rotatably mounted with the ends thereof disposed between said trailer wheels to provide stability of the trailer as an automobile is being towed thereby, and means disposed on said trailer frame adjacent each trailer wheel for said support frame to bear against and to guide said ends of said support frame over said trailer frame as said support frame rotates relative to said trailer frame.

4. A towing trailer of the type for supporting either the front or back pair of wheels of an automobile or the like comprising; an axle, a trailer wheel rotatably mounted on each end of said axle, a tongue connected at one end to said axle and adapted to be connected at the other end to a towing vehicle, a support frame rotatably mounted on said axle for cradling any one of various pairs of automobile wheels which may have any one of various different distances therebetween and for allowing the automobile wheels to contact said axle when disposed thereabove, and arcuate means disposed on said axle adjacent each trailer wheel for said support frame to bear against and to guide said support frame over said axle upon rotation of said support frame.

5. A towing trailer of the type for supporting either the front or the back pair of wheels of an automobile or the like comprising; an axle, a trailer wheel rotatably mounted on each end of said axle, a tongue connected at one end to said axle and adapted to be connected at the other end to a towing vehicle, a support frame rotatably mounted on said trailer frame for cradling any one of various pairs of automobile wheels which may have any one of various different distances therebetween and for allowing the automobile wheels to contact said trailer frame, said support frame being rotatably mounted with the ends thereof disposed between said trailer wheels to provide stability of the trailer as an automobile is being towed thereby, and arcuate means disposed on said axle adjacent each trailer wheel for said support frame to bear against and to guide said ends of said support frame over said axle as said support frame rotates relative to said axle.

6. A towing trailer of the type for supporting either the front or back pair of wheels of an automobile or the like comprising; an axle, a trailer wheel rotatably mounted on each end of said axle, a tongue connected to said axle at one end and adapted to be connected to a towing vehicle at the opposite end, a support frame rotatably mounted on said axle for cradling any one of various pairs of automobile wheels which may have any one of various different distances therebetween and for allowing the automobile wheels to contact said axle when disposed thereabove, arcuate means disposed on said axle adjacent the trailer wheels for said support frame to bear against and to guide said support frame over said axle upon rotation of said support frame, a pair of ramps, means on said tongue for removably securing said ramps on said tongue, and means along said support frame for supporting one end of each of said ramps so that either the front or back pair of wheels of an automobile may be rolled up the respective ramps and into a cradled position in said support frame.

7. A towing trailer as set forth in claim 6 wherein, when said towing trailer is attached to a towing vehicle, the upward extremity of said ramps when secured on said tongue is substantially level with the upward extremity of said support frame so that a plurality of said towing trailers may be stacked one upon the other whereby the stacked towing trailers will be substantially horizontally disposed.

8. A towing trailer of the type for supporting either the front or back pair of wheels of an automobile or the like comprising; an axle, a trailer wheel rotatably mounted on each end of said axle, a tongue connected at one end to said axle and adapted to be connected to a towing vehicle at the opposite end, a support frame rotatably mounted on said trailer frame for cradling any one of various pairs of automobile wheels which may have any one of various different distances therebetween and for allowing the automobile wheels to contact said axle when disposed thereabove, said support frame being rotatably mounted with the ends thereof disposed between said trailer wheels to provide stability of said trailer as an automobile is being towed thereby, an arcuate member disposed on said axle adjacent each trailer wheel for said support frame to bear against and to guide said ends of said support frame over said axle as said support frame rotates relative to said axle, a pair of ramps, means on said tongue for removably securing said ramps on said tongue, and means along said support frame for supporting one end of each of said ramps so that a pair of automobile wheels may be rolled up said respective ramps and into a cradled position on said support frame.

9. A towing trailer as set forth in claim 8 wherein, when said towing trailer is attached to a towing vehicle, the upward extremity of said ramps when placed on said tongue is substantially level with the upward extremity of said support frame so that a plurality of said towing trailers may be stacked one upon the other whereby the stacked towing trailers will be substantially horizontally disposed.

10. A towing trailer of the type for supporting either the front or back pair of wheels of an automobile or the like comprising; an axle, a trailer wheel rotatably mounted on each end of said axle, a tongue connected at one end to said axle and adapted to be connected to a towing vehicle at the opposite end, a support frame rotatably mounted on said trailer frame for cradling any one of various pairs of automobile wheels which may have any one of various different distances therebetween and for allowing the automobile wheels to contact said axle when disposed thereabove (said support frame being rotatably mounted with the ends thereof disposed between said trailer wheels to provide stability of said trailer as an automobile is being towed thereby, an arcuate member disposed on said axle adjacent each trailer wheel for said support frame to bear against and to guide said ends of said support frame over said axle as said support frame rotates relative to said axle, a pair of ramps, a pair of structural members each connected at one end thereof adjacent one end of said axle and connected to said tongue at the opposite end thereof, a support shaft connected to said tongue, said ramps each having a hole therethrough for removably placing said ramps transverse said tongue with said support shaft extending through said apertures, means selectively engageable with said support shaft to prevent said ramps from being removed from said tongue, means on said structural members to engage said ramps when said ramps are placed on said tongue to prevent said ramps from rotating about said support shaft, and means along said support frame for supporting one end of each of said ramps so that a pair of automobile wheels may be rolled up said respective ramps and into a cradled position on said support frame.

11. A towing trailer as set forth in claim 10 wherein, when said towing trailer is attached to a towing vehicle, the upward extremity of said ramps when placed on said tongue is substantially level with the upward extremity of said support frame so that a plurality of said towing trailers may be stacked one upon the other whereby the stacked towing trailers will be substantially horizontally disposed.

12. A towing trailer of the type for supporting either the front or back pair of wheels of an automobile or the like comprising; an axle, a trailer wheel rotatably mounted on each end of said axle, a tongue connected to said axle at one end and adapted to be connected at the opposite end to a towing vehicle, a pair of elongated parallel members, means adjacent the ends of said parallel members to secure said parallel members in spaced apart relationship, arcuate members attached to said axle adjacent each trailer wheel for said means to bear against, a plate interconnecting said parallel members substantially midway along the length thereof, shaft means extending from said axle and journaled in said plate for rotatably supporting said parallel members and said means, and said parallel members being spaced for cradling any one of various pairs of automobile wheels which may have any one of various different distances therebetween and for allowing automobile wheels to contact said axle when cradled thereabove.

13. A towing trailer of the type for supporting either the front or back pair of wheels of an automobile or the like comprising; an axle, a trailer wheel rotatably mounted on each end of said axle, a tongue connected to said axle at one end and adapted to be connected at the opposite end to a towing vehicle, a pair of elongated parallel members, connecting members adjacent the ends of said parallel members to secure said parallel members in spaced apart relationship, arcuate members attached to said axle adjacent each trailer wheel for said connecting members to bear against, a plate interconnecting said parallel members substantially midway along the length thereof, shaft means extending from said axle and journaled in said plate for rotatably supporting said parallel members and said connecting members, said parallel members being spaced to cradle therebetween any one of various pairs of automobile wheels which may have different distances therebetween so that the automobile wheels may contact said axle when cradled thereabove, a pair of ramps, means on said tongue for removably securing said ramps on said tongue when said ramps are not in use, and means along one of said parallel members for supporting one end of each of said ramps so that a pair of automobile wheels may be rolled up said ramps and moved into a cradled position between said parallel members.

14. A towing trailer as set forth in claim 13 wherein the upward extremity of said ramps when secured on said tongue is substantially level with the upward extremity of said parallel members so that towing trailers of this type may be stacked one upon the other whereby the stacked towing trailers will be substantially horizontally disposed.

15. A towing trailer of the type for supporting either the front or back pair of wheels of an automobile or the like comprising; an axle, a trailer wheel rotatably mounted on each end of said axle, a tongue connected to said axle at one end and adapted to be connected at the opposite end to a towing vehicle, a pair of elongated parallel members, connecting members adjacent the ends of said parallel members to secure said parallel members in spaced apart relationship, arcuate members attached to said axle adjacent each trailer wheel for said connecting members to bear against, a plate interconnecting said parallel members substantially midway along the length thereof, a shaft extending from said axle and journaled in said plate for rotatably supporting said parallel members and said connecting members, said parallel members being spaced to cradle therebetween any one of various pairs of automobile wheels which may have different distances therebetween so that the automobile wheels may contact said axle when cradled thereabove, a pair of ramps, a pair of structural members each connected at one end thereof adjacent one end of said axle and connected at the opposite end thereof to said tongue, a threaded support shaft connected to said tongue, said ramps each having a hole therethrough for removably placing said ramps transverse said tongue with said support shaft extending through said apertures, a threaded nut selectively engageable with said support shaft to secure said ramps on said support shaft when said ramps have been placed on said tongue with said support shaft extending through said holes in said ramps, a flange on each of said structural members to engage said ramps to prevent rotation of said ramps when placed on said support shaft, a flange means disposed along the one of said elongated members which is disposed rearwardly of said trailer for supporting one end of each of said ramps so that when said ramps are placed on said flange means a pair of automobile wheels may be rolled up said respective ramps and into a cradled position between said parallel members, and means on said one end of each of said respective ramps for engaging said one of said elongated members to prevent said respective ramps from slipping off said flange means.

16. A towing trailer as set forth in claim 15, wherein, when said towing trailer is attached to a towing vehicle, the upward extremity of said ramps when placed on said tongue is substantially level with the upper extremity of said parallel members so that a plurality of said trailers may be stacked one upon the other whereby the stacked trailers will be substantially horizontally disposed.

17. A towing trailer of the type for supporting either the front or back pair of wheels of an automobile or the like comprising; a trailer frame, a support frame rotatably mounted on said trailer frame, a pair of ramps adapted to coact with said support frame for moving a pair of wheels of an automobile onto said support frame, and means on said trailer frame for removably storing said ramps on said trailer frame forward of said support frame and in such a disposition that said ramps and said support frame coact to support a like trailer thereon whereby a plurality of trailers may be stacked one upon the other such that all of the stacked trailers have the same disposition relative to the ground.

18. A towing trailer as set forth in claim 17 wherein, when said towing trailer is attached to a towing vehicle, the upward extremity of said ramps when secured on said trailer frame is substantially level with the upward extremity of said support frame so that a plurality of said towing trailers may be stacked one upon the other whereby the stacked towing trailers will be substantially horizontally disposed.

19. A towing trailer of the type for supporting either the front or back pair of wheels of an automobile or the like comprising; a trailer frame including a tongue adapted to be connected to a towing vehicle, a support frame rotatably mounted on said trailer frame, a pair of ramps, means on said tongue for removably securing said ramps on said tongue, and said ramps and said support frame disposed so as to coact to support another trailer thereon.

20. A towing trailer as set forth in claim 19 wherein, when said towing trailer is attached to a towing vehicle, the upward extremity of said ramps when secured on said tongue is substantially level with the upward extremity of said support frame so that a plurality of said towing trailers may be stacked one upon the other whereby the stacked towing trailers will be substantially horizontally disposed.

References Cited by the Examiner
UNITED STATES PATENTS

| 2,463,744 | 3/1949 | Clemens. |
| 2,491,318 | 12/1949 | Knapp _____ 214—334 |
| 2,639,926 | 5/1953 | Parks. |
| 2,701,069 | 2/1955 | Hawkins _____ 214—86 |
| 2,723,770 | 11/1955 | Gretener _____ 214—10.5 X |
| 3,258,146 | 6/1966 | Hamilton _____ 214—620 |

GERALD M. FORLENZA, *Primary Examiner.*

ALBERT J. MAKAY, *Examiner.*